United States Patent
Hare et al.

(10) Patent No.: US 12,454,929 B1
(45) Date of Patent: Oct. 28, 2025

(54) ROCKET MOTOR INCLUDING AN EMBEDDED CHARGE ASSEMBLY (ECA) CONFIGURED TO SUPPORT A BURN RATE ENHANCEMENT (BRE) WIRE

(71) Applicant: Raytheon Company, Arlington, VA (US)

(72) Inventors: David E. Hare, Beverly, MA (US); Mitchell L. Moffet, Tucson, AZ (US); Jacob A. Pinello-Benavides, Vail, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/960,990

(22) Filed: Nov. 26, 2024

(51) Int. Cl.
 *F02K 9/24* (2006.01)
 *F02K 9/26* (2006.01)
 *F02K 9/36* (2006.01)
 *F02K 9/95* (2006.01)

(52) U.S. Cl.
 CPC ............ *F02K 9/24* (2013.01); *F02K 9/26* (2013.01); *F02K 9/36* (2013.01); *F02K 9/95* (2013.01)

(58) Field of Classification Search
 CPC ..... F02K 9/24; F02K 9/26; F02K 9/36; F02K 9/95
 See application file for complete search history.

(56) References Cited

U.S. PATENT DOCUMENTS

| | | | | |
|---|---|---|---|---|
| 3,266,240 A | * | 8/1966 | Kurylko | F02K 9/26 102/352 |
| 3,322,067 A | * | 5/1967 | Gould | F02K 9/95 102/202 |
| 6,363,855 B1 | | 4/2002 | Kim et al. | |
| 11,008,263 B2 | | 5/2021 | Isert et al. | |
| 11,008,264 B2 | | 5/2021 | Slade, Jr. et al. | |
| 11,732,676 B1 | | 8/2023 | Sadler et al. | |
| 11,746,729 B1 | | 9/2023 | Borissov et al. | |

FOREIGN PATENT DOCUMENTS

WO WO-2003058049 A2 7/2003

* cited by examiner

*Primary Examiner* — Steven M Sutherland
(74) *Attorney, Agent, or Firm* — Schwegman Lundberg & Woessner, P.A.

(57) ABSTRACT

In a rocket motor in which burn rate enhancement (BRE) wires are used to accelerate the burn rate of the solid propellant, embedded charge assemblies (ECAs) are configured as support structures for the BRE wires. Each ECA includes an energetic material that is configured to burn along with the solid propellant to produce thrust and, upon detonation, to break up the solid propellant to terminate thrust. The detonation may also be initiated as a part of process to prevent a higher-order reaction, such as in reaction to heating from a fire or other cause. By being located inside the casing, the energetic material and ECAs do not adversely affect aerodynamics of the flight vehicle of which the rocket motor is a part, such as a missile.

20 Claims, 13 Drawing Sheets

ROCKET MOTOR INCLUDING AN EMBEDDED CHARGE ASSEMBLY (ECA) CONFIGURED TO SUPPORT A BURN RATE ENHANCEMENT (BRE) WIRE

BACKGROUND

Field

This disclosure relates to flight termination and Insensitive Munition (IM) of rocket propelled vehicles and rocket motors.

Description of the Related Art

A rocket motor includes a solid propellent in a casing that surrounds the solid propellent. An initiator initiates the solid propellant such that that burn front moves axially forward until all the solid propellant is consumed. This produces hot gasses that are expelled through a nozzle to propel the rocket forward.

To increase or control the rate at which the solid propellent burns, one or more burn rate enhancement (BRE) wires can be inserted into the solid propallant along the axis of the rocket motor. The wires have a higher burning rate than the surrounding propellant and create increased surfaces area. The wires are typically wound in a helical orientation with the pitch of the winding dictating in part the bulk motor burn rate. Because the wires tend to be quite brittle, the wires are typically would around an inert support structure such as a nylon rod. See U.S. Pat. Nos. 11,008,264, 11,008,263 and 11,746,728.

Insensitive munitions (IMs) and range safety requirements necessitate devices capable of splitting the rocket motor of a missile, either to terminate flight or to prevent a high order reaction. Such devices have usually been placed on the outside of the missile body, increasing aerodynamic drag and potentially limiting the size of the rocket motor and the range of the system.

U.S. Pat. No. 11,732,676 entitled "Rocket Motor With Embedded Burnable Cutting Explosive Energetic Material" issued Aug. 22, 2023 discloses a rocket motor having an energetic material between solid fuel (propellant) and a casing that surrounds the solid fuel. The energetic material is configured to be burned along with the solid fuel during normal operation of the rocket motor to produce thrust. The energetic material can also be detonated to cause rupture of the casing to terminate flight or prevent a higher-order process.

SUMMARY

The following is a summary that provides a basic understanding of some aspects of the disclosure. This summary is not intended to identify key or critical elements of the disclosure or to delineate the scope of the disclosure. Its sole purpose is to present some concepts of the disclosure in a simplified form as a prelude to the more detailed description and the defining claims that are presented later.

In a rocket motor in which burn rate enhancement (BRE) wires are used to accelerate the burn rate of the solid propellant, embedded charge assemblies (ECAs) are configured as support structures for the BRE wires. Each ECA includes an energetic material that is configured to burn along with the solid propellant to produce thrust and, upon detonation, to break up the solid propellant to terminate thrust. The detonation may also be initiated as a part of process to prevent a higher-order reaction, such as in reaction to heating from a fire or other cause. By being located inside the casing, the energetic material and ECAs do not adversely affect aerodynamics of the flight vehicle of which the rocket motor is a part, such as a missile.

In an embodiment, a rocket motor includes a solid propellant in a casing and one or more burn rate enhancement (BRE) wires embedded in the solid propellant along or parallel to its long axis. One or more first embedded charge assemblies (ECAs) provide a support structure for respective BRE wires. Each ECA includes an energetic material that extends along or parallel to the axis. One or more initiators that are operatively coupled to the respective ECAs to detonate the energetic material. The energetic material is configured to burn along with the solid propellant to produce thrust in the rocket motor to be capable upon detonation to break up the solid propellant to terminate thrust without detonating the solid propellant.

In an embodiment, the solid propellant is a Highly Loaded Grain (HLG).

In an embodiment, each ECA includes one or more layers around the energetic material configured to dampen a shock wave produced by the detonation of the energetic material to avoid detonating the solid propellant while allowing sufficient energy to penetrate and break-up the solid propellant. The one or more layers may also form the support structure for the BRE wire. Each layer may be metal, plastic, Teflon, nylon etc. If there are two or more layers they are different materials with different densities to absorb shock. The layers may also be configured to re-direct or focus energy from the detonation wave into the solid propellant. The ECA including the energetic material and the one or more layers is made by an additive manufacturing process.

In an embodiment, the initiator is configured to trigger detonation of the energetic material upon occurrence of one or more circumstances selected from a temperature-related circumstance, a flight-related circumstance and a circumstance of active triggering by a remote operator. The initiators are positioned forward of the solid propellant.

In different embodiments, the BRE wire is either wrapped around the ECA or is wrapped around an inert rod in which the ECA is embedded.

In different embodiments, the energetic materials are configured to produce a spherical detonation or as a linear shaped charge (LSC), a Chevron, a spheric or an explosive embedded in the energetic material. The ECA may include a charge liner configured to distribute energy. The charge liner is suitably formed of a material selected metal, plastics, ceramics, or foam. All of the materials that constitute the ECA must burn or reduce to a sufficiently small size to ensure gas venting through the nozzle of the rocket motor during normal rocket motor operation to produce thrust.

In different embodiments, the solid propellant and energetic material may or may not be the same material or may be the same material but of different specific compositions (e.g., different binders or different percentages of constituent components). The composition materials may, for example, include ammonium perchlorate (AP), Hexanitrohexaazaisowurtzitane (CL-20), Octogen (HMX), Cyclonite (RDX), or other base explosives. The base explosives are mixed with binders to make an energetic material that will burn or detonate. More broadly, energetic materials allowed per RCC-319 may be used, such as Comp A3, Comp A4, Comp A5, Comp CH6, DIPAM, HNS Type 1 or Type 2 Gr A, HNS-IV, LX-14, PBX 9407, PBXN-5, PBXN-6, PBXN-7, PBXN-9, PBXN-11, PBXN-12, or PBXN-301.

In an embodiment, the rocket motor may include one or more additional ECAs between the solid propellant and the casing along the long axis and facing inward toward the solid propellant. Each additional ECA including energetic material configured to burn along with the solid propellant to produce thrust in the rocket motor and capable upon detonation to break up the solid propellant to terminate thrust. The additional ECAs may be configured as a LSC, a Chevron, a spheric or an explosive embedded in the energetic material.

In an embodiment, the rocket motor may include one or more additional ECAs between the solid propellant and the casing along the axis and facing outward toward the casing. Each additional ECA including energetic material configured to burn along with the solid propellant to produce thrust in the rocket motor and capable upon detonation to rupture the casing. The additional ECA is typically configured as one or more LSCs.

These and other features and advantages of the disclosure will be apparent to those skilled in the art from the following detailed description of preferred embodiments, taken together with the accompanying drawings, in which:

DETAILED DESCRIPTION

A rocket motor has a casing that surrounds a solid propellant and one or more burn enhancement wires (BREs) embedded in and along the length of the solid propellant accelerate the burn rate. One or more embedded charge assemblies (ECAs) provide a support structure for respective BRE wires. Each ECA includes an energetic material configured to be burned along with the solid propellant during normal operation of the rocket motor to produce thrust. The energetic material can also be detonated to cause break-up of the solid propellant without detonating the solid propellant. The detonation may be initiated as part of a flight termination process. The detonation may also be initiated as a part of process to prevent a higher-order reaction, such as in reaction to heating from a fire or other cause. Each ECA may, for example, include a portion of the energetic material configured to produce a spherical detonation or as part of a LSC, Chevron, spherical charge or embedded explosive charge. One or more liner layers may serve to dampen the shock wave caused by detonation of the energetic material to avoid detonating the solid propellant while allowing sufficient energy to penetrate and break-up the solid propellent. By being located inside the casing, the ECA does not adversely affect aerodynamics of the flight vehicle of which the rocket motor is a part, such as a missile. And by being burnable along with the solid fuel to produce thrust from the rocket vehicle, the energetic material contributes to efficiency in normal operation of the rocket motor. Additional ECAs may be formed between the casing and the solid propellant either facing inward to provide additional break-up of the solid propellant or facing outward to rupture the casing.

Referring now to FIGS. 1A-1E, a rocket motor 100 is depicted at various stages of propellant burn and then flight termination. Rocket motor 100 a solid propellant 102 within a casing 104 and a nozzle 106. The casing 104 may have a casing liner 108 on the inside of the casing 104. The casing 104 may be made of steel or a composite material, and the casing liner 108 may be made of phenolic or a polymeric material. A solid propellant 102 such as a Highly Loaded Grain (HLG)), does not have a central opening along the long axis, where the combustion of the solid propellant occurs at the aft face or end burning. The rocket motor is configured with one or more BRE wires 112 embedded in the solid propellant to accelerate the burn rate. Each BRE wire is quite brittle and must be supported by a support structure.

The rocket motor 100 is configured with one or more ECAs 114 that, at least in part, provide the support structure for respective BRE wires 112. The ECAs may be embedded in an inert rod (e.g., nylon) around which the BREs are wrapped. Each ECA 114 includes an energetic material 116 that is able, upon detonation, to break up solid propellant 102 of the rocket motor 100, in order to render the rocket motor 100 inoperative to produce thrust without detonating solid propellant 102. This may be done during flight to terminate flight, by initiating detonation of energetic material with one or more initiator 118 positioned forward of the one or more ECAs 114 such as a single multipoint detonation system. Alternatively, this may be as a safety measure, to break up the solid propellant when a missile reaches a predetermined temperature or range of temperatures, to render the rocket motor 100 inoperative when exposed to fire or other heating during transportation or storage (or otherwise when not in flight).

The energetic material 116 is burned as part of or along with the fuel (propellant) of the rocket motor 100, upon ignition by an igniter 120 to produce a burn front 122 and thrust. This burning of the solid propellant 102 produces pressurizes gasses, which exit the casing 104 through nozzle 106 at an aft end of the casing 104, producing thrust that propels the missile.

Some of the energetic material 116 may be burned (along with propellant) to produce thrust, before a remainder of the energetic material 116 is detonated to form detonations waves 124 that break up the solid propellant 102 into multiple pieces without detonating the solid propellant.

The burn front 122 of the solid propellant 102 and energetic material 116 as accelerated by the BRE wire(s) typically burns on a time-scale of a few seconds whereas the detonation wave 124 in the energetic material propagates backward to meet the burn front 122 on a time-scale of a few microseconds. As such, once detonation of the ECA(s) is initiated, rocket motor thrust is terminated almost instantly.

The ECA may include one or more layers that form a liner 126 around the energetic material that are configured to dampen a shock wave produced by the detonation of the energetic material 116 to avoid detonating the solid propellent 102 while allowing sufficient energy to penetrate and break-up the solid propellant 102. The one or more layers may also form the support structure for the BRE wire. Each layer may be metal, plastic, Teflon, nylon, ceramics, foam etc. If there are two or more layers, they may be different materials with different densities to reduce detonation shock to the solid propellant. The layers may also be configured to re-direct or focus energy from the detonation wave 124 into the solid propellent. All of the materials that constitute the ECA 114 must burn or reduce to a sufficiently small size to ensure gas venting through the nozzle of the rocket motor during normal rocket motor operation to produce thrust. The ECA 114, including the energetic material and the one or more layers, may be made by an additive manufacturing process.

The solid propellent and energetic material may or may not be the same material or may be the same material but of different specific compositions (e.g., different binders or different percentages of constituent components). The composition materials may, for example, include ammonium perchlorate (AP), Hexanitrohexaazaisowurtzitane (CL-20), Octogen (HMX), Cyclonite (RDX), or other base explosives. The base explosives are mixed with binders to make an energetic material that will burn or detonate. More broadly, energetic materials allowed per RCC-319 may be used, such as Comp A3, Comp A4, Comp A5, Comp CH6, DIPAM, HNS Type 1 or Type 2 Gr A, HNS-IV, LX-14, PBX 9407, PBXN-5, PBXN-6, PBXN-7, PBXN-9, PBXN-11, PBXN-12, or PBXN-301.

An ECA may be configured as a single continuous uniform structure that extends along the long axis. For example, a simple continuous liner may be configured for spherical detonation along the axis. For example, a single LSC, Chevron, spheric or embedded explosive may extend along the long axis. Alternately, a plurality of ECAs may be positioned to extend along the long axis. The ECAs may all be of the same type or different types (e.g., alternating LSC and spherical). The ECAs may be separated by detonation ("det") cord.

The initiator 118 is configured to trigger detonation of the energetic material 116 upon occurrence of one or more circumstances including a temperature-related circumstance, a flight-related circumstance and active triggering by a remote operator.

The energetic material 116 extends along an axial direction of the rocket motor. The energetic material 116 may extend aftward from a forward bulkhead of the casing 104. The energetic material 116 may extend aftward over part or all of the length of the rocket motor 100. The initiator 118 for the energetic material 116 may be located on a bulkhead 128. The initiator 118 may be an exploding foil initiator that includes a thin conductive foil that is heated and vaporized by application of an electric current. The vaporization of the metal foil accelerates a flyer, such as made of steel or aluminum, and causes the flyer to impact the bulkhead. The shock from the impact of the flyer on the bulkhead traverses the bulkhead to detonate the energetic material 116.

Other types of detonators or initiators for the energetic material are possible. For example, a detonator may also be placed directly against the bulkhead to rely on strictly shock transfer through the bulkhead to initiate detonation of the energetic material.

Although the operation is described below in the context of a missile, it will be appreciated that principles described below may be usable other contexts. For example the principles may be used in rocket motors in other sorts of flight vehicles and/or munitions. For example, the rocket motor as described in the various embodiments herein may be part of a spacecraft or a commercial rocket.

Figure 1A:
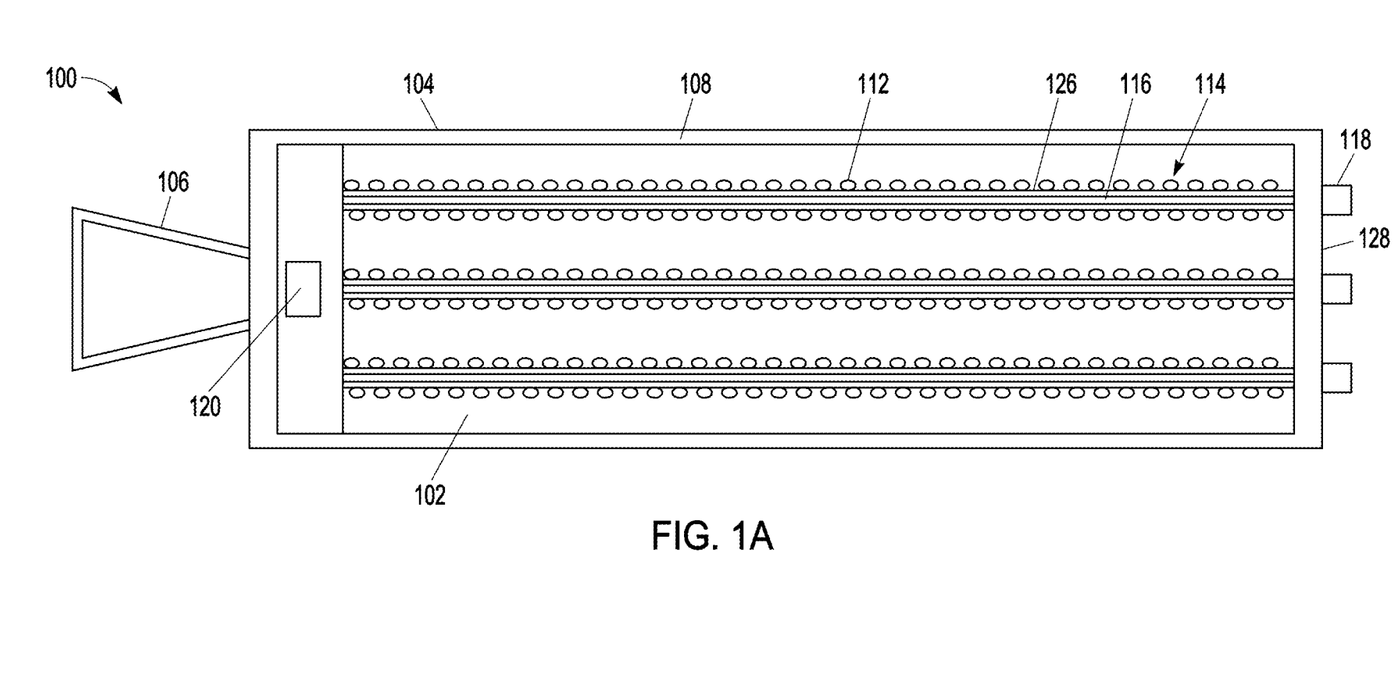
FIGS. 1A-1E are side sectional views of an embodiment of a plurality of ECAs embedded with a BRE wire along the axis of the solid propellant in a rocket motor during solid propellant burn and subsequent detonation of the ECA to break-up the solid propellant.
Figure 1B:
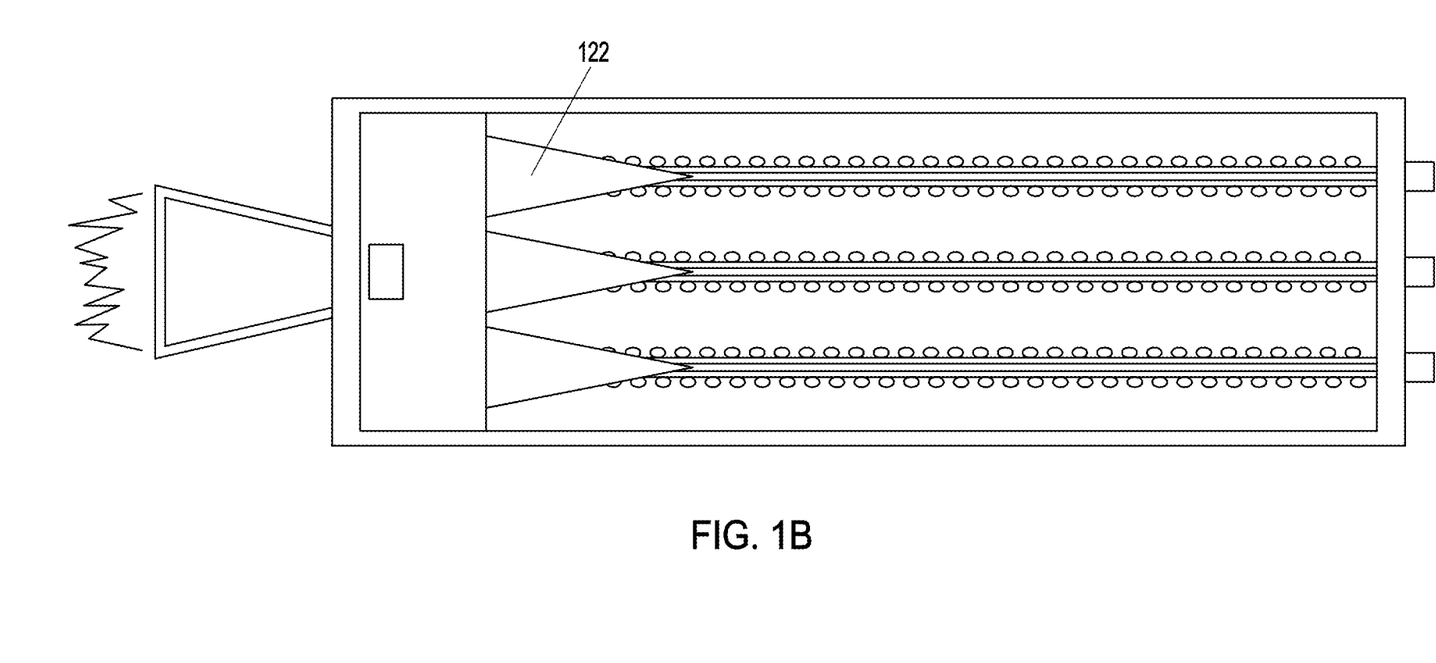
Figure 1C:
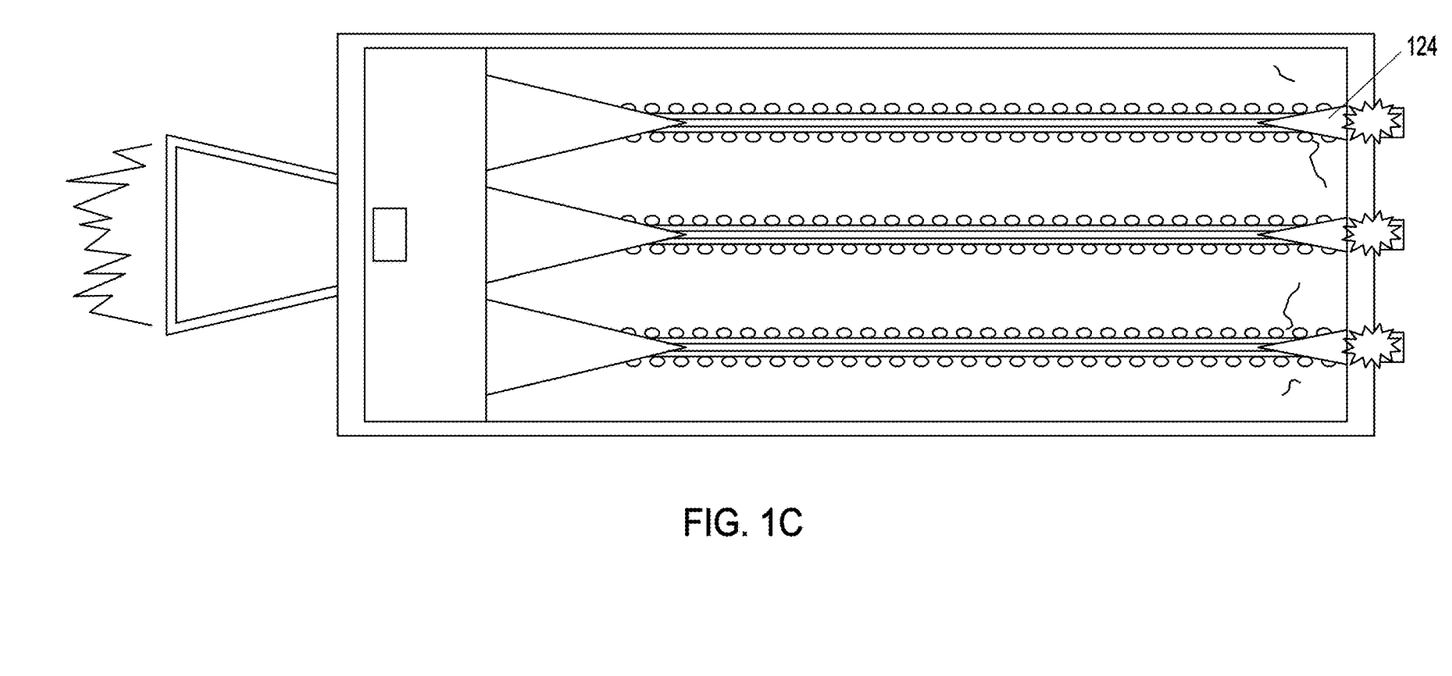
Figure 1D:
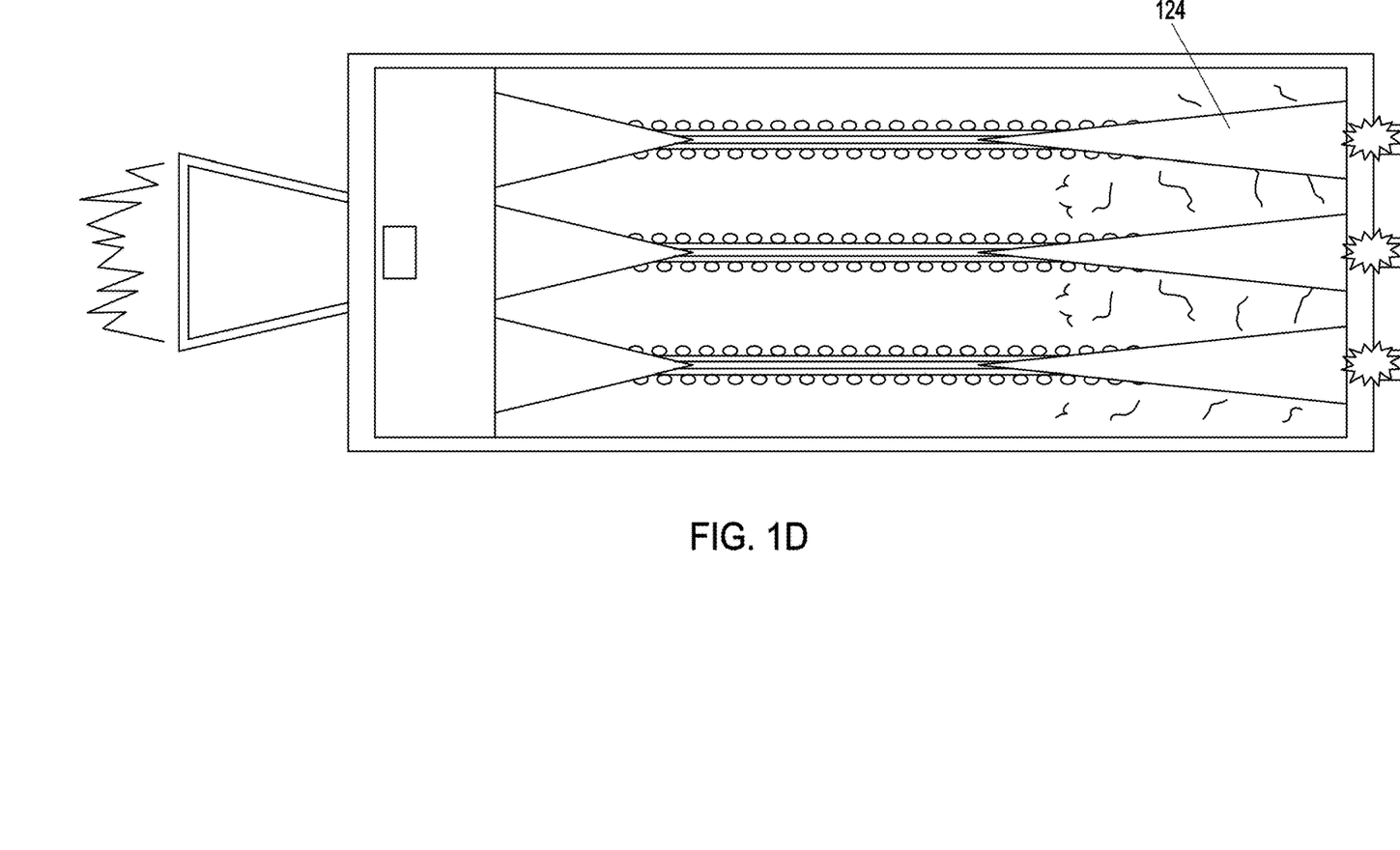
Figure 1E:
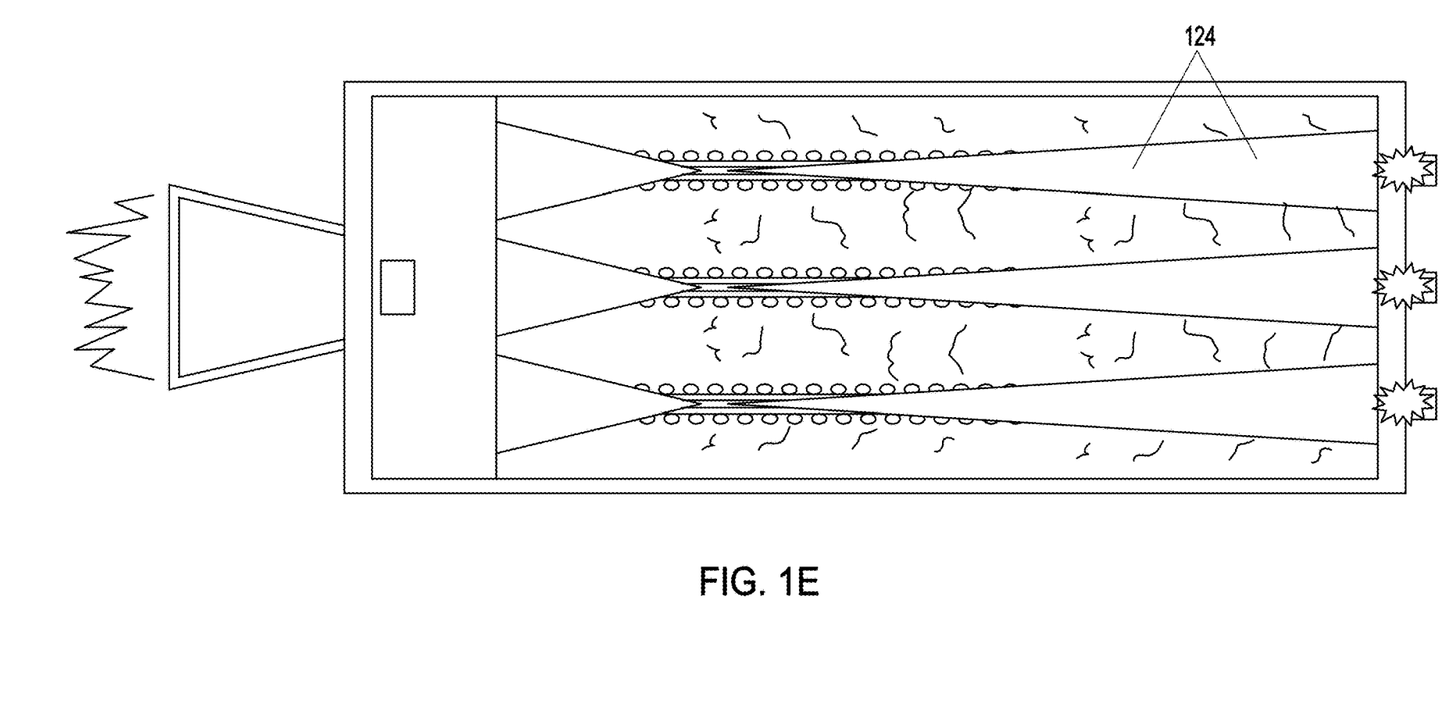
Figure 2A:
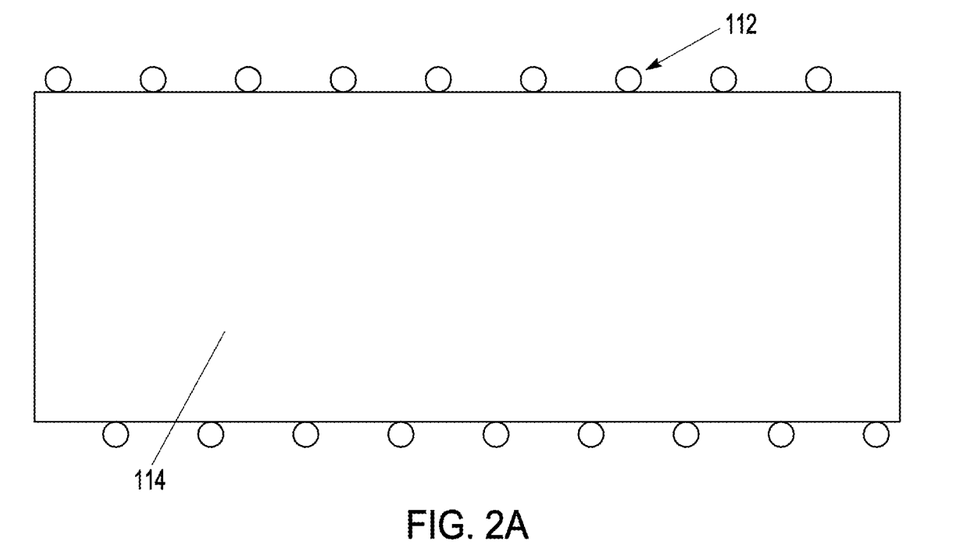
FIGS. 2A and 2B are views of a BRE wire wrapped around an ECA and a BRE wire wrapped around an inert rod in which an ECA is embedded.
Figure 2B:
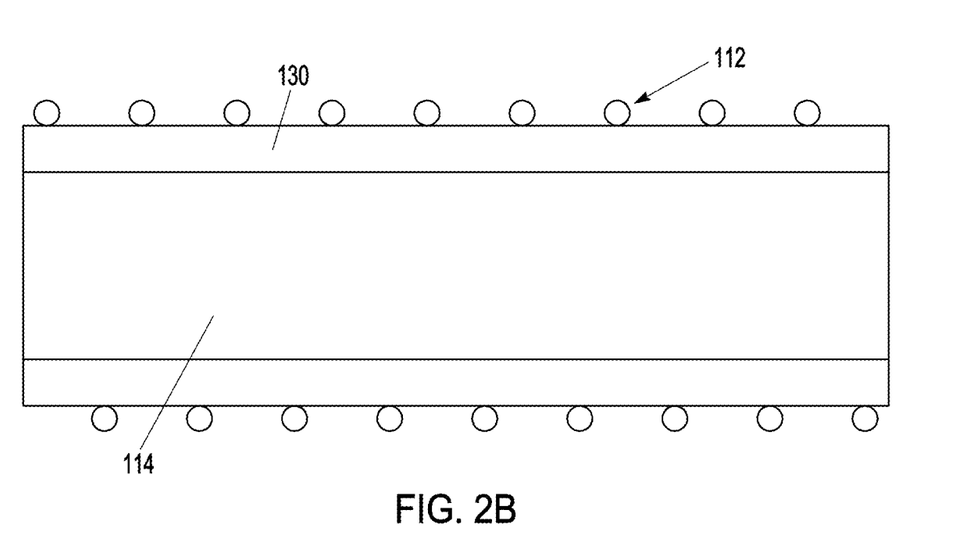

Referring now to FIGS. 2A-2B, the BRE burn wire 112 may be wrapped around an inert rod 130 such as nylon and the ECA 114 embedded within the inert rod 130 or the BRE burn wire 112 may be wrapped directly around the ECA 114.

Referring now to FIGS. 3A-3G, different embodiments of an ECA are configured to provide additive thrust during normal operation of the rocket motor and to detonate and break up the solid propellent without detonating the solid propellent upon flight germination.

Figure 3A:
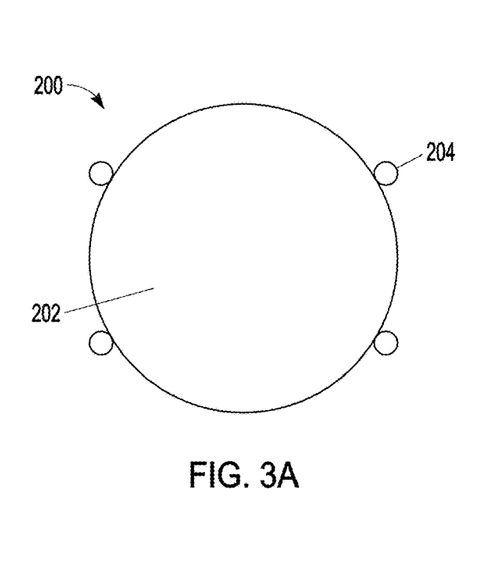
FIGS. 3A-3G are end views of different configurations of an ECA.

As shown in FIG. 3A, an ECA 200 includes only energetic material 202 and a BRE wire 204 is wrapped directly on and around energetic material 202.

Figure 3B:
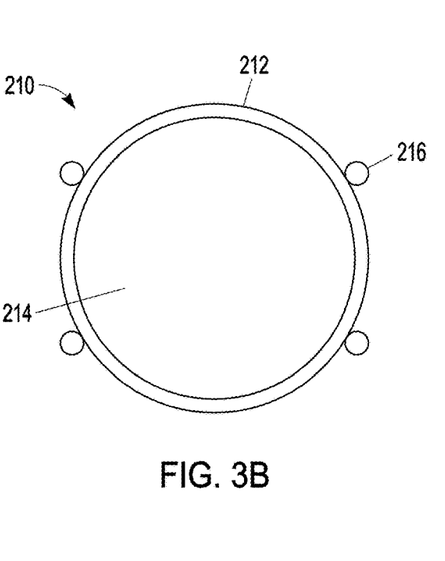

As shown in FIG. 3B, an ECA 210 includes a single layer 212 of metal, plastic, nylon, Teflon, ceramic, foam etc. wrapped around an energetic material 214 and a BRE wire 216 wrapped around single layer 212. Certain energetic materials lack strength and may require a layer to provide adequate mechanics support for the BRE wire. The single layer may also provide sufficient damping of the shockwave produced by detonation of the energetic material.

Figure 3C:
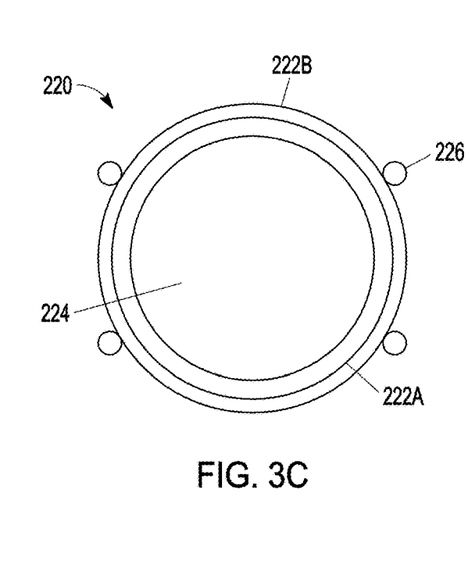

As shown in FIG. 3C, an ECA 220 includes two or more layers 222a, 222b, . . . of different materials having different densities around an energetic material 224 to create a density delta to absorb the shock wave and provide the requisite support structure for a BRE wire 226.

Figure 3D:
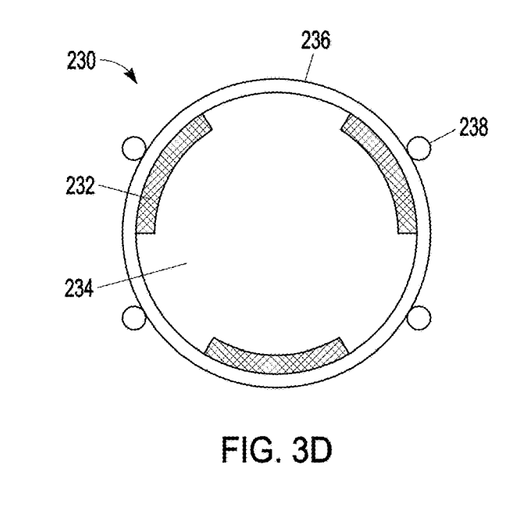

As shown in FIG. 3D, an ECA 230 includes a segmented layer 232 of relatively high density material in and around an energetic material 234 and a contiguous layer of relatively low density material 236 wrapped by a BRE wire 238. This structure provides the requisite support for the BRE wire, damping of the shock wave and concentration of the energy into three lobes to break up the solid propellent.

Figure 3E:
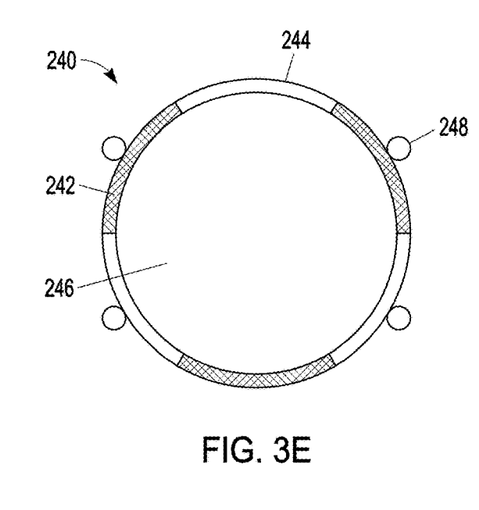

As shown in FIG. 3E, an ECA 240 includes a layer having alternating segments 242 and 244 of relatively high and low density materials around an energetic material 246 wrapped by a BRE wire 248. This structure provides the requisite support for the BRE wire, damping of the shock wave and concentration of the energy into three lobes to break up the solid propellent.

Figure 3F:
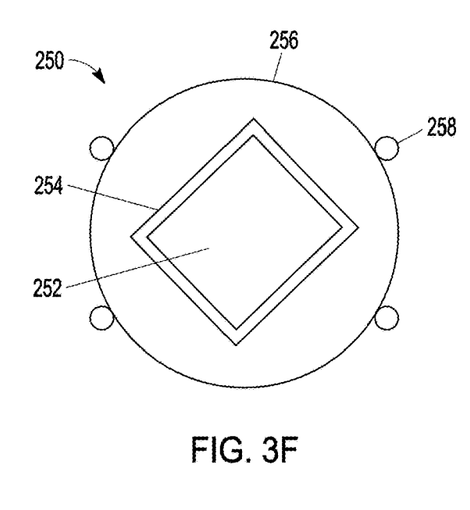

As shown in FIG. 3F, an ECA 250 includes a rectangular shaped energetic material 252 with a liner 254 of one or more layers embedded in a cylindrical support structure 256 around which a BRE wire 258 is wound. The energetic material may have various non-circular or non-cylindrical shapes.

Figure 3G:
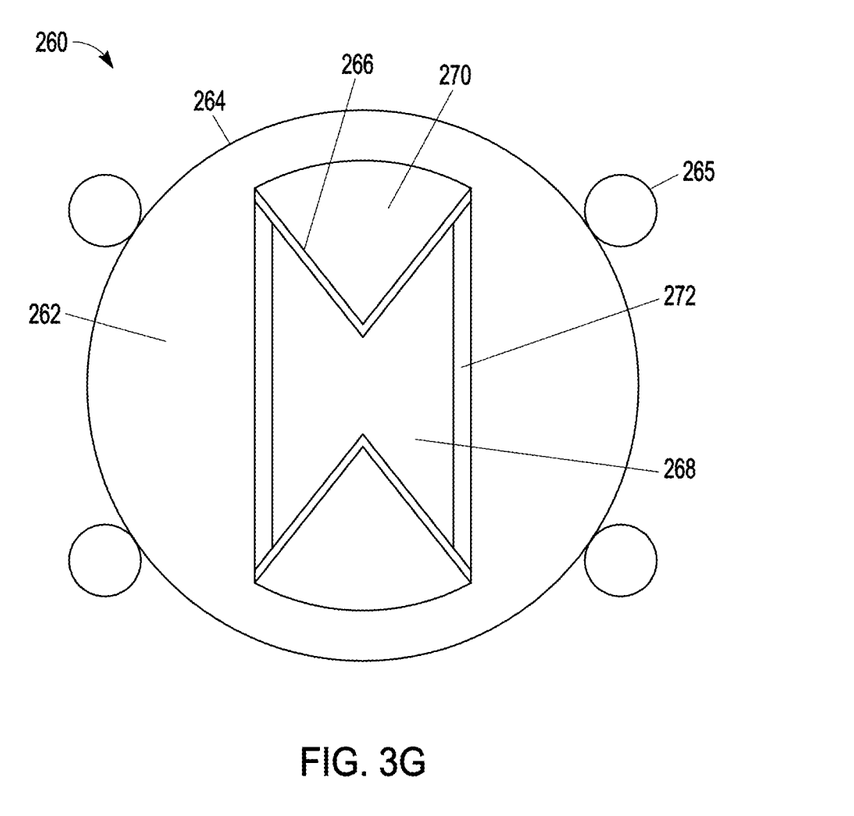

As shown in FIG. 3G, an ECA 260 includes a double Chevron 262 embedded in a support structure 264 around which a BRE wire 265 is wound. Each Chevron includes a charge liner 266 on a surface of an energetic material 268. The charge liner 266 suitably has an inverted wedge or inverted V-shape. The charge liner may face radially outward toward the casing or radially inward toward the center solid propellent. A void space 270 lies between the inverted wedge-shaped liner 266 and the support structure. A liner 272 may also be placed between the sides of the energetic material 268 and support structure 264. The double Chevron 262 provides sufficient directed energy to break up the solid propellent while damping the shock wave.

In other embodiments, the ECA may be formed as a LSC, a spheric charge or by an embedded explosive.

The LSC includes a charge liner on a surface of the energetic material. The charge liner is preferably formed on a surface of a void in the energetic material. The void and charge liner are suitably "wedge or V-shaped". The charge liner may face radially outward toward the casing or radially inward toward the center of the solid propellent.

The spheric charge includes a charge liner on a surface of the energetic material. The liner may have a hemispheric, sectioned hemispheric or spherical shape, and may face radially outward or inward.

The embedded explosive may be a different energetic material that upon detonation is capable of breaking up the solid propellant.

Referring now to FIGS. 4A-4B and 5A-5C, an embodiment of a rocket motor 318 includes a plurality of ECAs 300 (and initiators 301) that provide support structures for BRE wires 302 embedded in a solid propellant 328, and inward and outward facing ECAs 353 and 352, respectively, positioned between solid propellant 328 and a casing 324. ECAs 300 and 353 are configured to produce detonation waves 304 and 306, respectively, break up the grain of the solid propellant 328 to terminate thrust without detonating the solid propellant and ECA 352 is configured to produce detonation wave 308 to rupture casing 324 upon a command for flight termination or other IM scenarios.

Figure 4A:
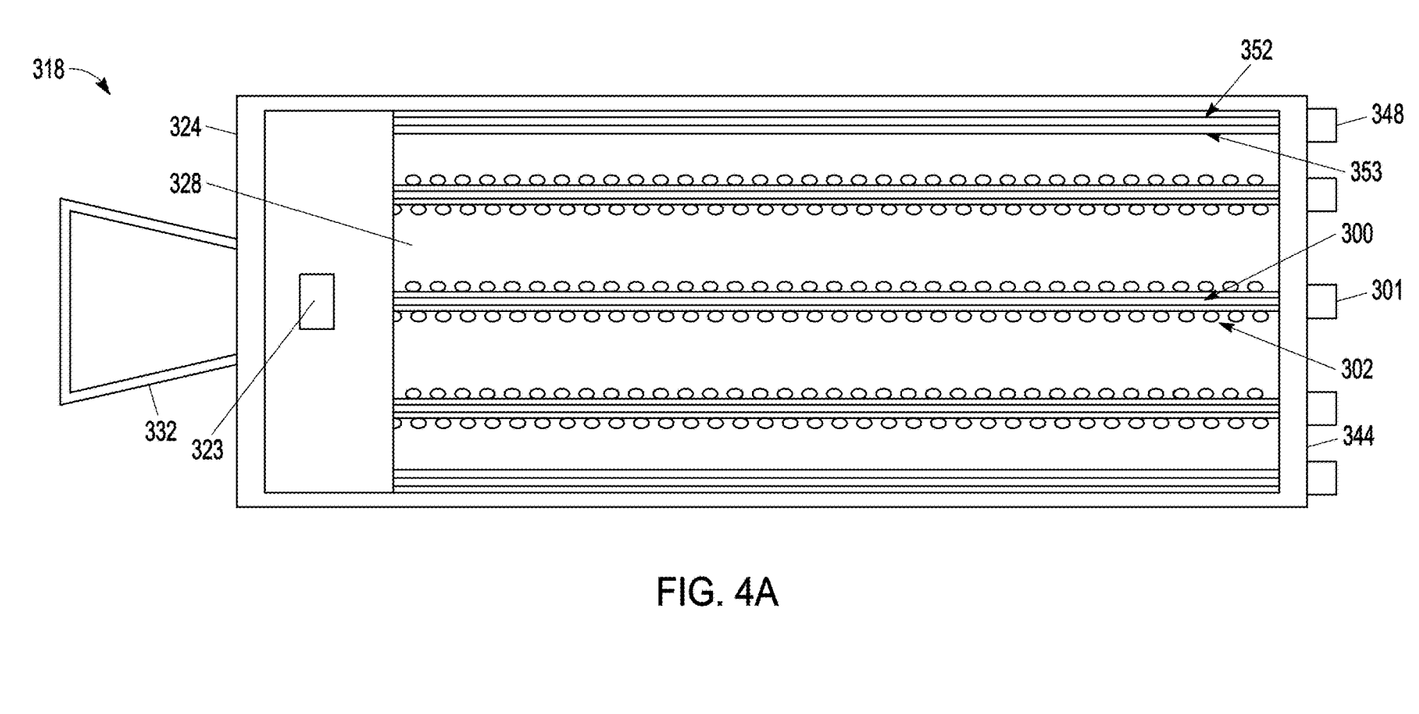
FIG. 4A-4B are side sectional views of an embodiment of a rocket motor including an ECA embedded in one or more burn wires and a dual-ECA positioned between the casing the solid propellant to break up the solid propellant and rupture the casing.
Figure 4B:
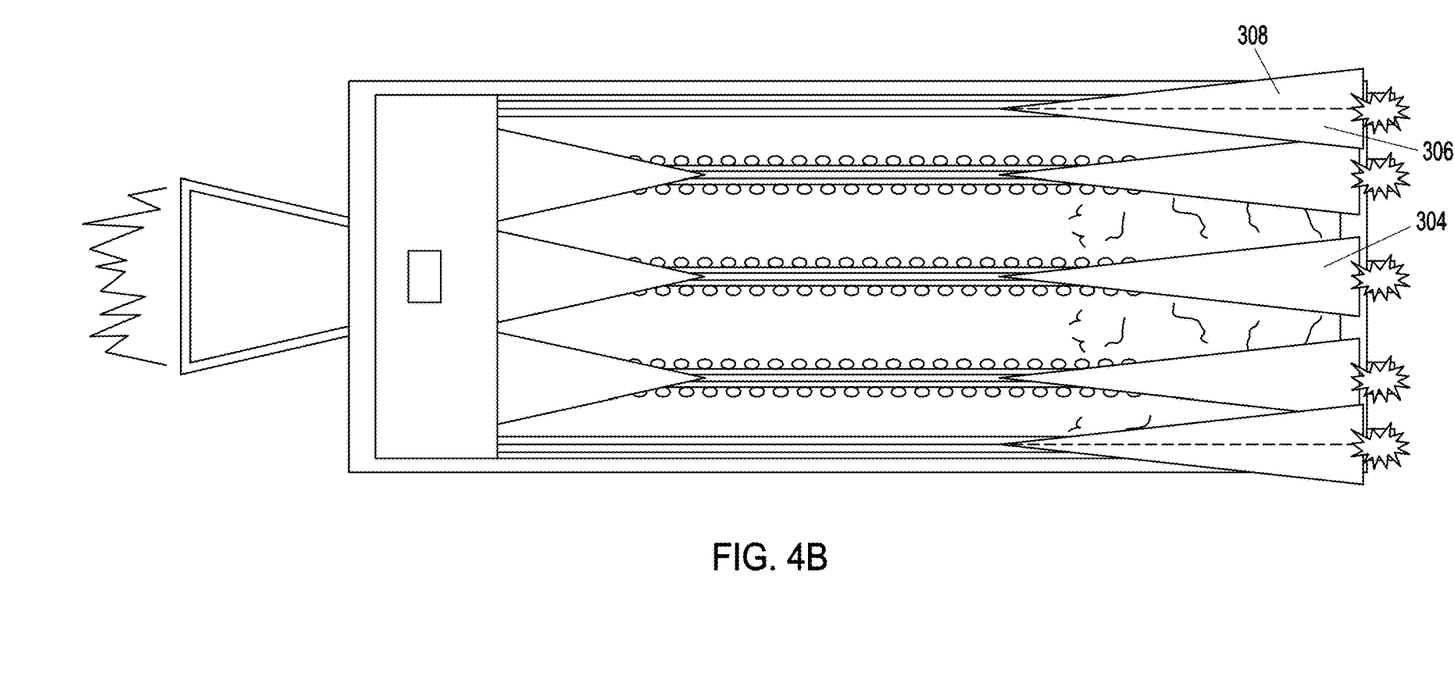

The solid propellant 328 is a HLG. The combustion of the solid propellant 328 occurs across the aft face of the HLG. This burning of the solid propellant 328 produces pressurizes gasses, which exit the casing 324 through nozzle 332 at an aft end of the casing 324, producing thrust that propels the missile.

The casing 324 may be made of steel or a composite material, and a casing liner 330 may be made of phenolic or a polymeric material. The solid propellant 328 may be of any of a variety of solid fuel materials, for example materials such as ammonium perchlorate.

Energetic material 322 for ECAs 352 and 354 is located inside the casing 324, between the solid propellant 328 and the casing 324. The energetic material 322 may be located inside of a casing liner 330. The energetic material 322 may be situated along a surface of the casing liner 330. The solid propellant 328 and energetic material 322 may or may not be the same material or may be the same material but of different specific compositions (e.g., different binders or different percentages of constituent components).

The energetic material 322 may extend along an axial direction of the rocket motor 318. The energetic material 322 may extend aftward from a forward bulkhead 344 of the casing 324. The energetic material 322 may extend aftward over part or all of the length of the rocket motor 318. An initiator 348 for the energetic material 322 may be located on the bulkhead. The initiator 348 may be an exploding foil initiator that includes a thin conductive foil that is heated and vaporized by application of an electric current. The vaporization of the metal foil accelerates a flyer, such as made of steel or aluminum, and causes the flyer to impact the bulkhead 344. The shock from the impact of the flyer on the bulkhead 344 traverses the bulkhead 344 to detonate the energetic material 322.

Other types of detonators or initiators for the energetic material 322 are possible. For example, a detonator may also be placed directly against the bulkhead 344 to rely on strictly shock transfer through the bulkhead 344 to initiate detonation of the energetic material 322.

Figure 5A:
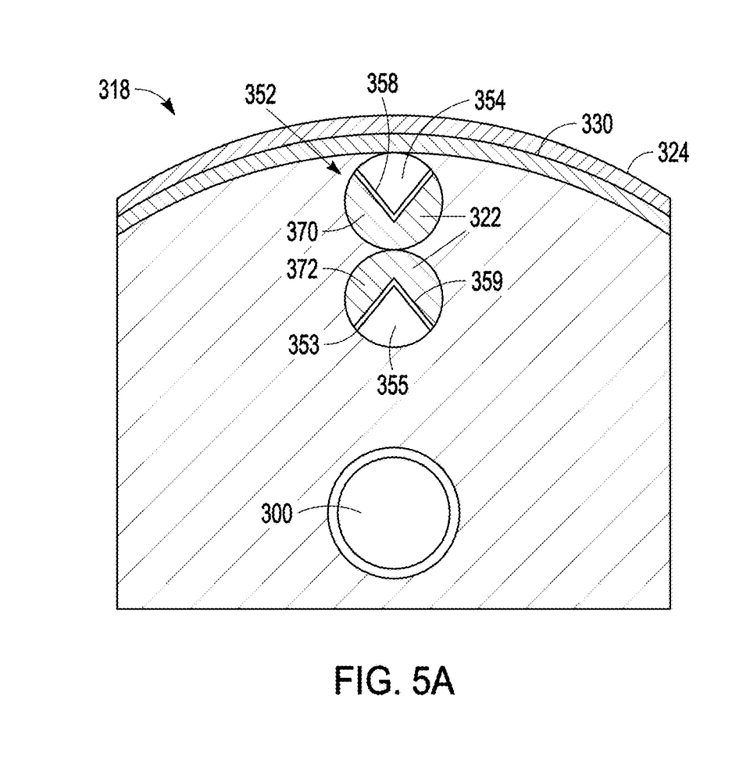
FIGS. 5A-5C are section views of a portion of the rocket motor.
Figure 5B:
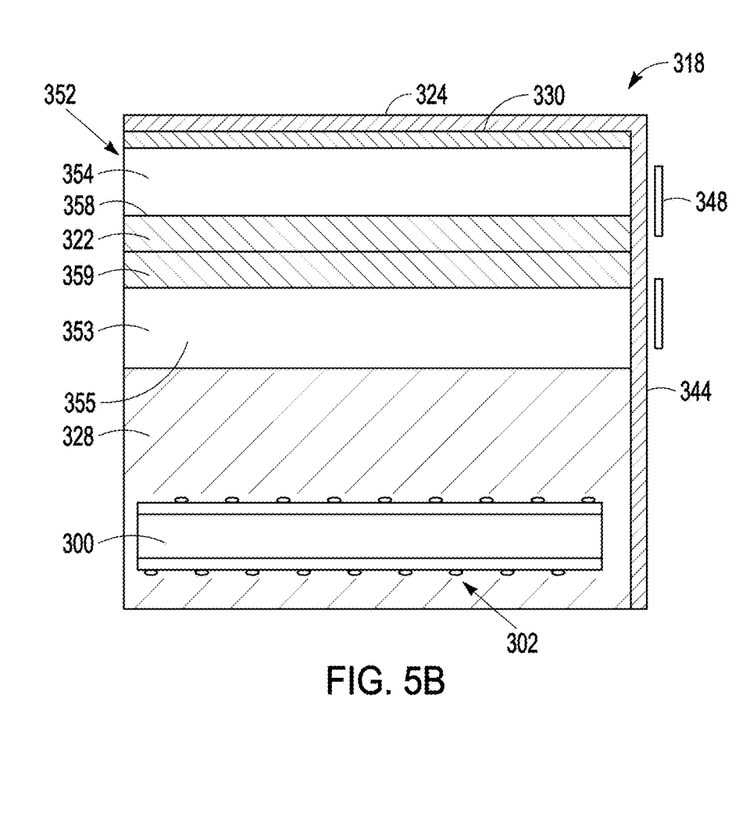

Referring now in addition to FIG. 5B, a portion 370 of energetic material 322 may be configured as part of ECA 352 oriented along the long axis of the rocket motor and facing outward toward casing 324 and a portion 372 of energetic material 322 may be configured as part of ECA 353 oriented along the long axis of the rocket motor and facing inward toward solid propellant 328. In this example, both the outward and inward facing ECAs are configured as linear shape charges (LSCs) although the ECAs may be LSCs, Chevrons, spherical charges or explosives although the outward facing ECA 352 is typically a LSC.

ECA 352 distributes the force (energy) of the detonation of the energetic material 322 radially outward to split (rupture) the casing 324. To that end, the portion 370 of energetic material 322 has a wedge-shape opening (void) 354, in which the energetic material 322 does not extend. A charge liner 358 is on a surface of the portion 370 energetic material 322 that adjoins the wedge-shaped opening 354. The charge liner 358 may be a metal material such as aluminum, or a plastic material, such as high-density polyethylene (HDPE), ceramic or foam.

ECA 353 distributes the force (energy) of the detonation of the energetic material 322 radially inward to break up the solid propellant 328 into multiple pieces. To that end, the portion 372 of energetic material 322 has a wedge-shape opening (void) 355, in which the energetic material 322 does not extend. A charge liner 359 is on a surface of the portion 372 energetic material 322 that adjoins the wedge-shaped opening 355. The charge liner 359 may be a metal material such as aluminum, or a plastic material, such as high-density polyethylene (HDPE) or ceramic or foam.

Figure 5C:
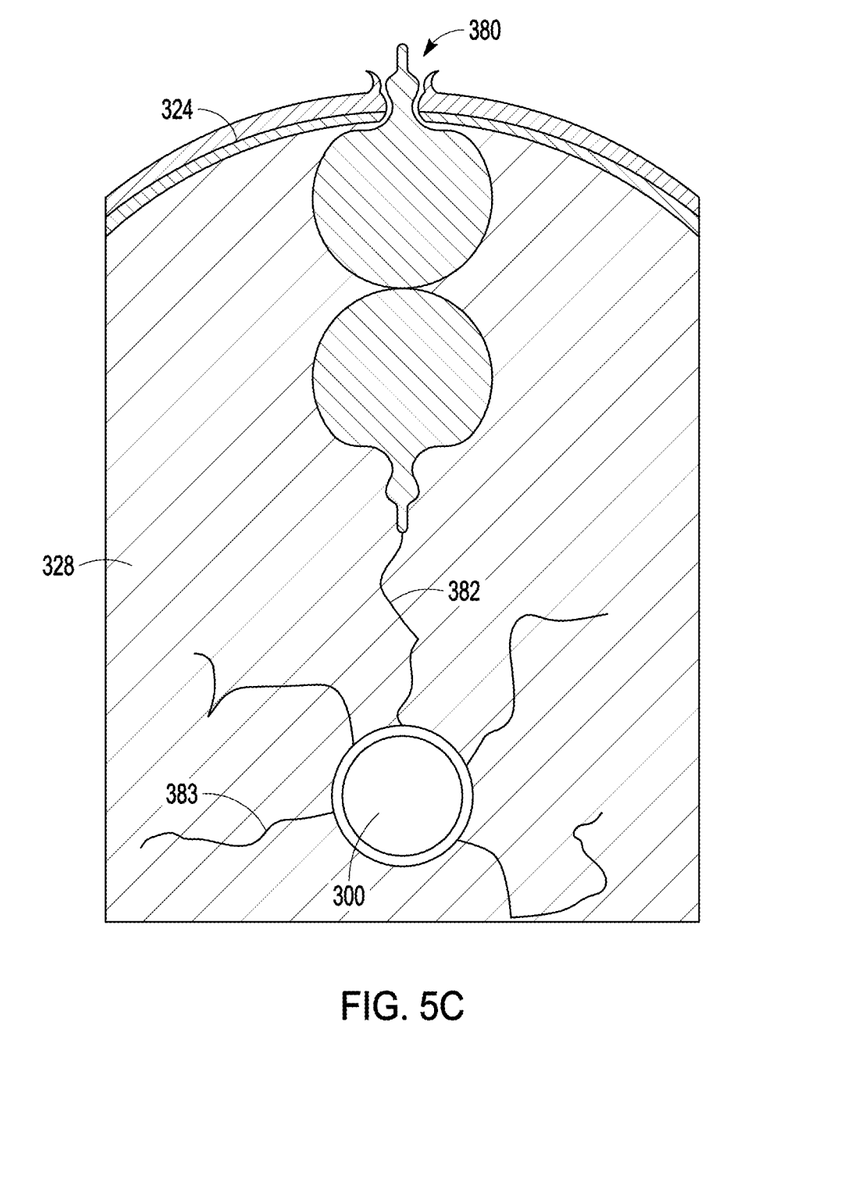

Detonation of the energetic material 322 proceeds aft in detonation waves 306 (inward) and 308 (outward) from the bulkhead 344. As shown in FIG. 5C, the shape of the portion 370 of energetic material 322 concentrates explosive energy in the void 354. This drives the charge liner 358 into the void 354, making the charge liner 358 into a jet that drives into and through the casing 324. This causes a bulge in and eventually rupture 380 of the casing 324. The shape of the portion 372 of energetic material 322 concentrates explosive energy in the void 355. This drives the charge liner 359 into the void 355, making the charge liner 359 into a jet that drives into and through the solid propellant 328 breaking the solid propellant into pieces along fracture lines 382. Detonation of ECA 300 proceeds aft in detonation wave 304 breaking the solid pieces into fracture lines 383. Because detonation of the energetic material 322 proceeds aft until it runs into the burn front of the solid propellant, the solid propellant is broken into pieces at the burn front effectively terminating thrust immediate (when in flight).

As mentioned above, the ECA may, for example, be a LSC, wedge-shaped charge or "Chevron", a spherical charge (hemispheric, sectioned hemispheric or spherical), or an explosive. Typically, the outward facing ECA to rupture the casing is an LSC because the resulting jet is efficient at cutting the higher density rocket motor case. The inward facing ECA to break up the solid propellant may be any one of the LSC, Chevron, spherical charge, embedded explosive or a combination thereof to most effectively and efficiently break up the solid propellant to terminate thrust. Furthermore, the outward facing and inward facing ECAs may be separate structures as depicted in FIG. 5B or they may be integrated into a single structure in which the first and second portions of the energetic material is a common portion of energetic material.

To effectively disable the rocket motor, the energetic material and the outward and inward facing ECAs should extend along the long axis of the rocket motor from the bulkhead to the aft end of the rocket motor. There are many possible configurations for the axial structure of the ECAs. In one example, N ECAs, continuous or segmented, are formed in the energetic material between the casing and solid propellant that extend along a long axis of the rocket motor, either linearly or wrapped in a spiral structure. The ECAs may all be of the same type or of different types. N radial or "ring shaped" ECAs may be spaced along the long axis, and may be combined with one or more linear or spiral ECAs. The particular configuration will depend on the design of the rocket motor and the solid propellant. For simplicity of illustration, each axial structure is assumed to include an integrated ECA.

According to an embodiment of any paragraph(s) of this summary, the rocket motor further includes an insulative material between the solid propellant and the energetic material that acts as a barrier or shock attenuator to prevent ignition and detonation of the solid propellant from the energetic material. The insulative material is preferably positioned around each of the ECAs. The insulative material is preferably a burnable material.

While several illustrative embodiments of the disclosure have been shown and described, numerous variations and alternate embodiments will occur to those skilled in the art. Such variations and alternate embodiments are contemplated, and can be made without departing from the spirit and scope of the disclosure as defined in the appended claims.

We claim:

1. A rocket motor comprising:
   a casing having an axis;
   a solid propellant;
   one or more burn rate enhancement (BRE) wires embedded in the solid propellant along or parallel to the axis, each said BRE wire configured to burn to accelerate a burn rate of the solid propellant;
   one or more first embedded charge assemblies (ECAs) providing a support structure for respective BRE wires along the axis, each said first ECA including an energetic material that extends along or parallel to the axis, wherein the energetic material is configured to burn along with the solid propellant to produce thrust in the rocket motor; and
   one or more initiators that are operatively coupled to the respective first ECAs to detonate the energetic material;
   wherein the energetic material is configured to be capable upon detonation to break up the solid propellant to terminate thrust.

2. The rocket motor of claim 1, wherein each said first ECA includes one or more layers around the energetic material configured to dampen a shock wave produced by the detonation of the energetic material to avoid detonating the solid propellant while allowing sufficient energy to penetrate and break-up the solid propellant.

3. The rocket motor of claim 2, wherein each said first ECA including the energetic material and the one or more layers is made by an additive manufacturing process.

4. The rocket motor of claim 1, wherein the solid propellant is a Highly Loaded Grain (HLG).

5. The rocket motor of claim 1, wherein the one or more initiators are configured to trigger detonation of the energetic material upon occurrence of one or more circumstances selected from a temperature-related circumstance, a flight-related circumstance and a circumstance of active triggering by a remote operator.

6. The rocket motor of claim 1, wherein the one or more initiators are positioned forward of the solid propellant.

7. The rocket motor of claim 1, wherein each of the one or more BRE wires is wrapped around a respective one of the one or more first ECAs.

8. The rocket motor of claim 7, wherein each of the one or more BRE wires is wrapped around a respective inert rod, wherein each of the first ECAs is embedded in the respective inert rod.

9. The rocket motor of claim 1, wherein the energetic material is configured to produce a spherical detonation.

10. The rocket motor of claim 1, wherein each of the first ECAs includes one of a linear shaped charge (LSC), a Chevron, a spheric or an explosive embedded in the energetic material.

11. The rocket motor of claim 1, wherein each said BRE wire is supported by one of said first ECAs.

12. The rocket motor of claim 1, further comprising:
    one or more second ECAs between the solid propellant and the casing along the axis and facing inward toward the solid propellant, each said second ECA including energetic material configured to burn along with the solid propellant to produce thrust in the rocket motor and capable upon detonation to break up the solid propellant to terminate thrust.

13. The rocket motor of claim 12, where the one or more second ECAs includes one of a linear shaped charge (LSC), a Chevron, a spheric or an explosive embedded in the energetic material.

14. The rocket motor of claim 1, further comprising:
    one or more second ECAs between the solid propellant and the casing along the axis and facing outward toward the casing, each said second ECA including energetic material configured to burn along with the solid propellant to produce thrust in the rocket motor and capable upon detonation to rupture the casing.

15. The rocket motor of claim 14, wherein the one or more second ECAs include a linear shaped charge (LSC).

16. A rocket motor comprising:
    a casing having an axis;
    a solid propellant;
    one or more burn rate enhancement (BRE) wires embedded in the solid propellant along or parallel to the axis, each said BRE wire configured to burn to accelerate a burn rate of the solid propellant;
    one or more first embedded charge assemblies (ECAs) embedded in and providing a support structure for a respective BRE wire along the axis, each said first ECA including energetic material that extends along the axis, wherein the energetic material is configured to burn along with the solid propellant to produce thrust in the rocket motor and capable upon detonation to break up the solid propellant to terminate thrust; and
    one or more second ECAs between the solid propellant and the casing along the axis and facing outward toward the casing, each said second ECA including energetic material configured to burn along with the solid propellant to produce thrust in the rocket motor and capable upon detonation to rupture the casing.

17. The rocket motor of claim 16, wherein each said first ECA includes one or more layers around the energetic material configured to dampen a shock wave produced by the detonation of the energetic material to avoid detonating the solid propellant while allowing sufficient energy to penetrate and break-up the solid propellant.

18. The rocket motor of claim 16, further comprising:
    one or more third ECAs between the solid propellant and the casing along the axis and facing inward toward the solid propellant, each said third ECA including energetic material configured to burn along with the solid propellant to produce thrust in the rocket motor and capable upon detonation to break up the solid propellant to terminate thrust.

19. The rocket motor of claim 16, wherein each of the one or more BRE wires is wrapped around a respective one of the one or more first ECAs.

20. The rocket motor of claim 16, wherein each of the one or more BRE wires is wrapped around a respective inert rod, wherein each of the one or more first ECAs is embedded in the respective inert rod.

\* \* \* \* \*

UNITED STATES PATENT AND TRADEMARK OFFICE
CERTIFICATE OF CORRECTION

| | | |
|---|---|---|
| PATENT NO. | : 12,454,929 B1 | Page 1 of 1 |
| APPLICATION NO. | : 18/960990 | |
| DATED | : October 28, 2025 | |
| INVENTOR(S) | : Hare et al. | |

It is certified that error appears in the above-identified patent and that said Letters Patent is hereby corrected as shown below:

In the Claims

In Column 10, Line 17, in Claim 13, delete "where" and insert --wherein-- therefor Signed and Sealed this
Third Day of February, 2026

John A. Squires
*Director of the United States Patent and Trademark Office*